(12) United States Patent
Pfleging et al.

(10) Patent No.: US 7,774,232 B2
(45) Date of Patent: Aug. 10, 2010

(54) WIRELESS DISTRIBUTION OF CONTENT FILES

(75) Inventors: Gerald W. Pfleging, Batavia, IL (US); George P. Wilkin, Bolingbrook, IL (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 618 days.

(21) Appl. No.: 10/954,411

(22) Filed: Sep. 30, 2004

(65) Prior Publication Data

US 2006/0074766 A1 Apr. 6, 2006

(51) Int. Cl.
*G06Q 20/00* (2006.01)

(52) U.S. Cl. .............................. 705/16; 725/1; 235/385; 705/26

(58) Field of Classification Search ...................... 726/3; 455/403; 705/51
See application file for complete search history.

(56) References Cited

U.S. PATENT DOCUMENTS

| | | | | |
|---|---|---|---|---|
| 7,155,199 | B2* | 12/2006 | Zalewski et al. | 455/403 |
| 7,280,087 | B2* | 10/2007 | Williams et al. | 345/1.1 |
| 2002/0035697 | A1* | 3/2002 | McCurdy et al. | 713/200 |
| 2003/0208777 | A1* | 11/2003 | Danker et al. | 725/135 |
| 2005/0034115 | A1* | 2/2005 | Carter et al. | 717/173 |
| 2005/0172122 | A1* | 8/2005 | Risan et al. | 713/165 |
| 2006/0010203 | A1* | 1/2006 | Mrsic-Flogel et al. | 709/205 |
| 2006/0028689 | A1* | 2/2006 | Perry et al. | 358/3.28 |
| 2006/0064418 | A1* | 3/2006 | Mierau et al. | 707/9 |

FOREIGN PATENT DOCUMENTS

WO     WO 0199336 A1 * 12/2001

* cited by examiner

*Primary Examiner*—F. Zeender
*Assistant Examiner*—Luna Champagne
(74) *Attorney, Agent, or Firm*—Carmen Patti Law Group, LLC

(57) ABSTRACT

A point of sale terminal that can be used to sell commodities such as gasoline, is also used to wirelessly distribute content files, such as MP3 and video files. The content files are addressed to a particular wireless playback receiving device. Wireless distribution of content files at other merchant's sites whereat point of sale terminals can be used enables the contents of playback devices to be updated without having to couple the device to a computer. Receipt of payment or account information prior to file transmission helps protect against theft.

23 Claims, 5 Drawing Sheets

WIRELESS DISTRIBUTION OF CONTENT FILES

TECHNICAL FIELD

The invention relates generally to portable music players, such as MP3-file players, personal digital assistants and like devices. More particularly this invention relates to an apparatus and method for wirelessly distributing content to such devices.

BACKGROUND

APPLE® has enjoyed considerable success of its iPOD®. As is known, thousands of music files can be loaded into an iPOD® device with each song being selectable for playback by the user.

Songs for the iPOD® can be purchased from APPLE® by logging a personal computer onto a web site and downloading files into the computer. Once the files have been downloaded into the computer, they're downloaded into the iPOD®. After the files have been downloaded into the iPOD®, the iPOD® can play them back. Despite the relatively cumbersome two-step programming process, the APPLE® playback device has enjoyed so much success that other manufacturers are now selling competing products.

A problem with portable playback devices like the iPOD®, other portable MP3 players, and personal digital assistants (PDAs) is that they must be physically connected to a computer in order to acquire information. Requiring a physical connection means that the contents of a portable playback device cannot be changed unless it is attached to a computer. A portable playback device would become even more "portable" if it were possible to reprogram or download new information into the device without having to physically connect it to a computer. Thus, a need exists for an apparatus and method by which a portable playback device like an automotive MP3 System, PDA or a portable MP3 player, can be updated with new content wirelessly.

If a portable playback device could be loaded with information by a wireless transfer, the usefulness of such devices would be increased. If such devices could be reprogrammed by a wireless reprogramming device located near point of sale terminals that are used to sell other goods and services, it would be possible to purchase items like gasoline from a point of sale terminal, while also purchasing new songs, pictures, news or video files for the playback device.

As is known in the prior art, motor vehicle fuels can be purchased using a prior art, point of sale terminal by "swiping" a credit or debit card through a card reader and fueling the vehicle after the account information is verified and payment is assured. MOBIL Corporation operates gasoline stations whereat a purchaser having one of MOBIL's SPEEDPASS® devices simply waives the SPEEDPASS® device past a transducer on the gas pump. The credit card reader and the transducer in the MOBIL SPEEDPASS®-compatible gas pumps recognizes a purchaser and/or his/her account and links purchases of the products through the point of sale terminal to the individual and/or his/her accounts by which payment is made. The SPEEDPASS® and devices like it use a radio frequency identifier and are referred to herein as "RFID" devices. Such devices identify a particular consumer and at least one of his or her accounts so that the account is debited for purchases made at the point of sale terminal. Enabling the purchase of music files, video files, pictures and data files using a credit card or RFID transponder and wirelessly downloading them into a playback device would be an improvement over the prior art.

SUMMARY

The invention in one implementation encompasses a point of sale terminal that can wirelessly transmit content files that are addressed to a particular device such that only a receiving device with the exact same address can receive the files.

Another implementation of the invention encompasses a method. The method includes the steps of receiving an identification of an address of a device to which files are to be sent by radio transmission. An account from which payment funds are to be obtained is also identified. Once a file for wireless transmission is obtained, it is addressed to the destination device and transmitted to the device, which then stores the transferred file for subsequent playback.

DESCRIPTION OF THE DRAWINGS

Features of exemplary implementations of the invention will become apparent from the description, the claims, and the accompanying drawings in which:

DETAILED DESCRIPTION

As used herein, "content" is considered to include music, news, video, pictures, data, documents and other forms of information. "Content files" are digital files made up of digital data from which the various forms of content can be reproduced using an appropriate playback device. For example, an MP3 file can be played through an MP3 player, which will output audio through one or more speakers.

Figure 1:
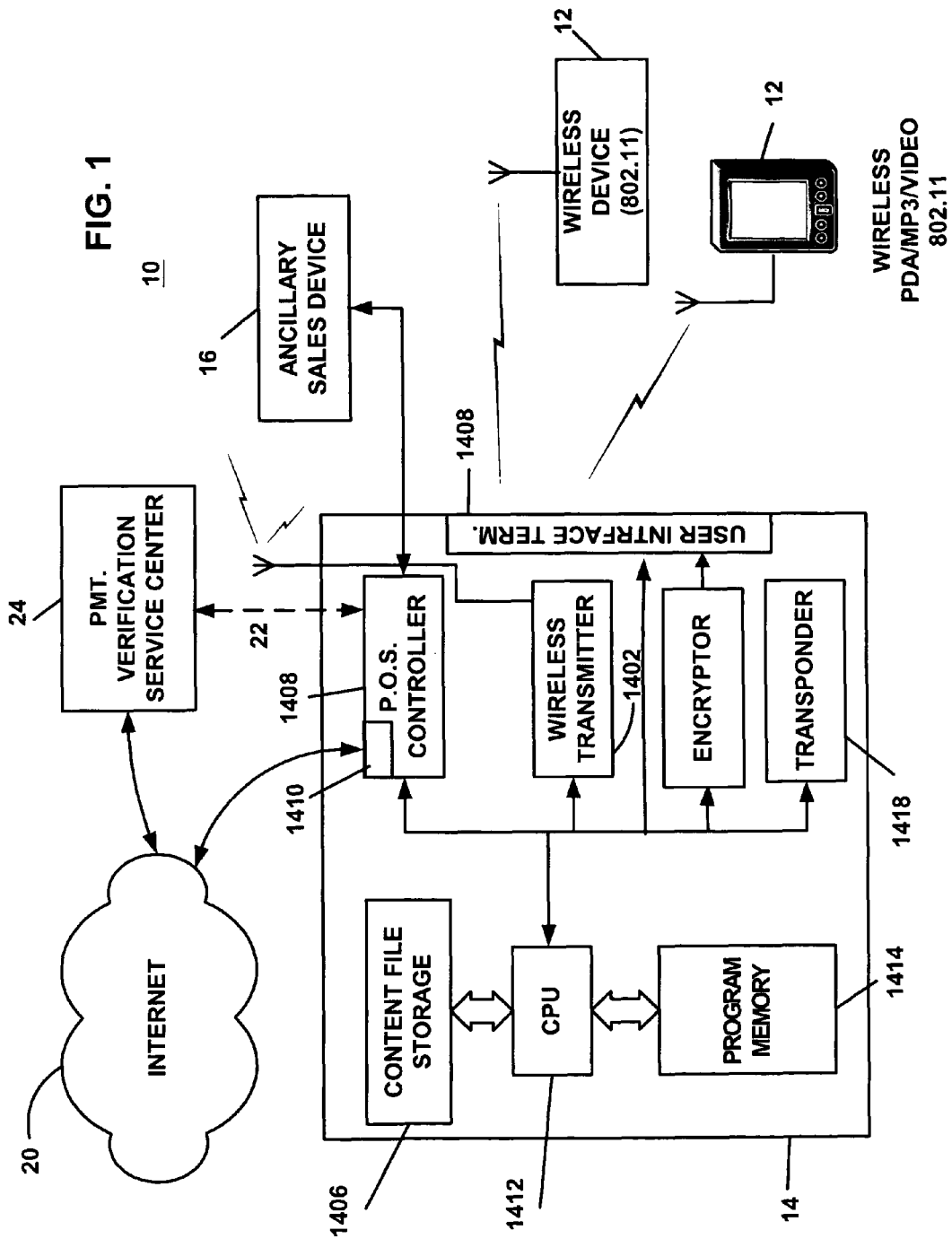
FIG. 1 is a representation of one implementation of a point of sale terminal device that is part of a point of sale/service system from which digital audio and video can be distributed.

FIG. 1 shows a system 10 for wirelessly distributing content files from a point of sale terminal 14, to a portable playback device 12. For purposes of this disclosure, the portable playback device 12 includes playback devices analogous to the currently-popular Apple® iPOD®, other MP3 players, personal digital assistants or "PDAs" and even including portable personal computers (laptops or notebook computers) and properly-equipped cell phones, albeit each having the capability of accepting file transfers wirelessly using protocols like the I.E.E.E. 802.11 protocol, instead of requiring a direct connection to a computer.

In a preferred embodiment, wireless file transfers into a playback device is accomplished in part by using the I.E.E.E. 802.11 protocol and wireless data transfer techniques like it. An 802.11-compliant device has its own address to which files can be addressed and transmitted wirelessly. By using the I.E.E.E. 802.11 protocol and others substantially equivalent thereto, a content file can be addressed to a particular device via the media access control or "MAC" address of said device and then broadcast from a standard-compliant radio transmitter over a geographic area. Only a standard-compliant receiver device having the particular MAC address within the transmitter's range will "receive" the file.

Those of ordinary skill in the art will recognize that data files like content files can be transmitted optically as well. Accordingly, for purposes of this disclosure, a wireless file transfer should be considered to include file transfers that occur by the transmission and reception of optical signals onto which content file data has been encoded or modulated.

The system 10 shown in FIG. 1 includes a point of sale terminal 14, the function and operation of which is analogous to the point of sale terminals that are currently in use at most gasoline stations in the United States, but having the ability to transmit content files wirelessly using a wireless data transfer protocol, such as but not limited to, the aforementioned I.E.E.E. 802.11 protocol. Among other things, the point of sale terminal 14 of FIG. 1 is provided with a radio-frequency transmitter 1402, a function of which includes transmitting signals according to a predetermined wireless data transfer protocol, such as the I.E.E.E. 802.11. Signals transmitted from the transmitter 1402 include data that represents the content to be played back from a wireless play back device 12. As is known, 802.11-compliant receiver devices 12 within the transmission range of the transmitter can receive only a file that is "addressed" to it by its MAC address.

Figure 2:
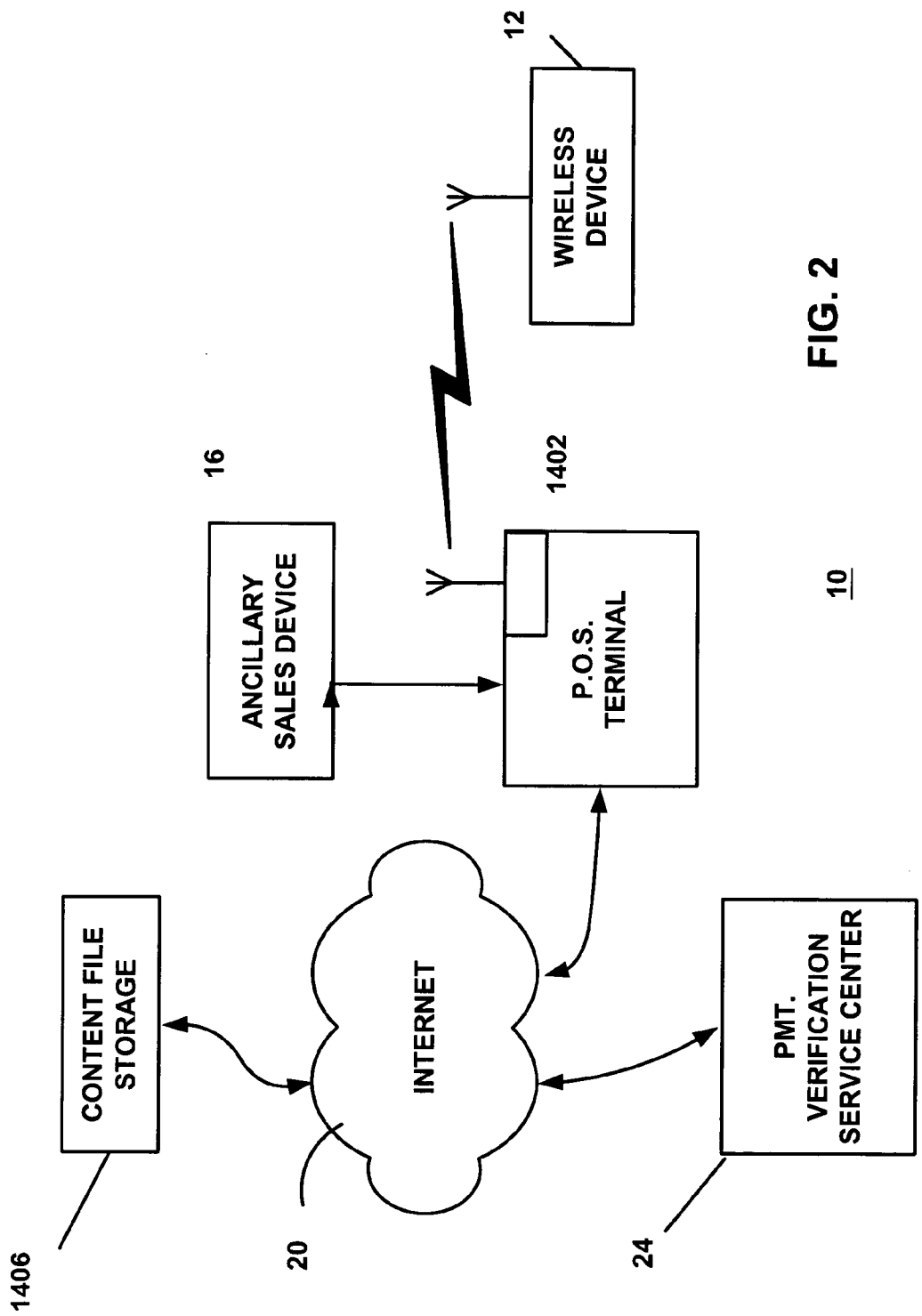
FIG. 2 is a representation of another implementation of a point of sale terminal device that is part of a point of sale/service system from which digital audio and video can be distributed.

In the point of sale terminal 14 depicted in FIG. 1, content files that available to be transmitted to a wireless playback device 12, are stored in at least one content file storage device 1406 within the terminal 14 enclosure, proximate to it by way of a direct, hard-wired connection, or otherwise co-located with it. In the alternate embodiment of the point of sale terminal 14 that is depicted in FIG. 2, the content files are stored on a device that is remotely located from the terminal 14 and accessed via the Internet 20 or other network.

Hard disk drives, CD-ROM, DVD disks, magnetic tape, Flash Memory, EEPROM are a few of the devices that can store content files such as MP3 music files and from which content files can be read and provided to the transmitter 1402 so that upon the file's reception, the content file can be played back by the wireless device 12 to which the file was transmitted. The content files stored in the content file storage device 1406 can include music files, in the MP3 or other lossey format, video files in multiple MPEG formats, JPEG files, data files like WORD and PDF files (including transaction receipts, such as a receipt for the purchase of other goods and services from the terminal 14) as well.

Similar to prior art point of sale terminals, the point of sale terminal 14 shown in FIG. 1 has a user-interface terminal 1408 on which information can be displayed to a user of the terminal 14 and through which a user can enter various data. Information displayed on and information received from the user interface terminal 1408 is under software control of a processor to which the terminal 1408 is coupled.

By way of example, a user of the terminal 1408 can enter his or her name, an account number by which payment will be effectuated, a MAC address of a device. In addition, using the terminal 1408 a user can view a list of content files available and select one or more content files for transmission from the transmitter to his MAC-addressable wireless playback device 12. The layout and organization of information on the user interface terminal 1408 will depend on the size and type of device and is therefore a design choice.

In addition to displaying content files that are available, information displayed in the user-interface terminal can include information pertinent to a user's purchase of goods, services or commodities from an ancillary sale device 16 such as a gasoline pump, food or beverage dispenser and the like.

In the embodiment shown in FIG. 1, the ancillary sales device 16 is coupled to and under the separate control of its own point of sale controller 1410, depicted in FIG. 1 as being within the point of sale terminal 14. In alternate embodiments, the ancillary sales device 16 controller 1410 does not need to be within the point of sale terminal 14.

The separate point of sale controller 1410 functions to effectuate the sale of goods, services or commodities from ancillary sales devices 16 such as a gasoline pump so that sales of content can be handled by a separate controller 1412 and its own associated program instructions. Using two separate controllers can simply the programming required to provide the two different functionalities, i.e., wireless content file distribution and commodity sales. Those of ordinary skill in the art will appreciate that while the point of sale terminal 14 shown in FIG. 1 uses a first processor 1412 for content file sales and a second processor 1410 to control an ancillary sales device 16, alternate and equivalent embodiments include using a single processor to control both tasks.

The first processor 1412 is shown in FIG. 1 "coupled" to the radio transmitter 1402, the user-interface terminal 1408, and the content file storage device 1406. Such a "coupling" is readily accomplished via the address, data and control bus that is common to virtually all microprocessors and microcontrollers but which are not separately shown in the figures for simplicity because address, data and control lines and their use is well-known.

The handling and control of devices that are peripheral to the processor 1412 can be accomplished in a variety of ways, e.g., by polling each device or by one or more devices asserting interrupt requests, etc, and is a design choice.

The processor 1412 in the point of sale terminal 14 that handles content file selection by a user, sales, and wireless transmission functionality by executing program instructions stored in one or more computer-readable signal-bearing media 1414, "operably coupled" to the processor 1412. Examples of computer-readable and signal-bearing media that can store program instructions include, but are not limited to, RAM, ROM, EPROM, Flash memory, EEPROM and combinations of each.

Stored within the media 1414 coupled to the processor 1412 are program instructions for the processor 1412, which when executed by the processor, imbue the point of sale terminal 14 with various capabilities set forth below in the discussion of FIG. 4 and as claimed in the appurtenant claims. Briefly however, the instructions stored in the computer-readable and signal-bearing media cause the processor to display information on and to read information from the user interface terminal 1408.

The program instructions enable the processor 1412 to display information on the user-interface terminal 1408 that includes, but is not limited to, a listing of songs, videos, files, news or other information that is stored in the content file storage device 1406. The functionality provided to the user-interface terminal 1408 by the processor 1412 instructions in memory, provides among other things, the ability of a person to select from the information presented, a least one content file to be transmitted into the person's wireless playback device 12 from the point of sale terminal 14. The user interface terminal 1408 also enables a user to enter a MAC address, an account number and other information. Accordingly, the program instructions stored in the memory 1414 cause the processor 1412 to read or other wise acquire information from the terminal that identifies at least a particular content file or files to transmit from the content file storage device 1406 to the transmitter 1402.

The processor 1412 handles the task of reading data bytes from the content file storage device 1406, wherever it might be located, and routing them to the transmitter 1402. In one embodiment, such a file transfer is performed by the processor 1412 reading the data byte-by-byte or in blocks of bytes, as many bytes from the content file storage device 1406 as the transmitter 1402 can accept for transmission, until the entire file is read from the storage device 1406 and output from the transmitter 1402. By controllably transferring data to the transmitter 1402, the processor 1412 effectuates the transmission of the content file selected by a user via the user interface device 1408, to the user's wireless playback device 12, which is presumably within the transmission range of the transmitter 1402 such that the signals from the transmitter 1402 can be received with sufficient amplitude so that the information encoded therein is recovered.

As set forth above, adding wireless file distribution to a point of sales terminal can increase revenue for content providers and merchants where such a terminal is put into service. As a practical matter however, increased revenue can only be realized if someone pays for the content files and/or the service of wirelessly distributing them. In a preferred embodiment, payment for a file and/or its wireless distribution into a wireless playback device is accomplished in at least one of two ways.

In at least one embodiment, a point of sale terminal 14 includes a radio frequency identification device (RFID) transponder 1418 capable of sensing devices like the SPEEDPASS®. The transponder 1418 is "coupled" to the processor 1412 via the processor's address, data and control busses. The transponder 1418 "reads" information encoded into a compatible RFID device, such that when the RFID is passed near the transponder 1418, the RFID device can identify, among other things, a MAC address to which a file is to be transmitted, a person to whom the RFID device was delivered, as well as an account such as a debit or credit account from which funds can be drawn to pay for a file transmission.

As is known, the MOBIL® SPEEDPASS® is an example of an RFID device that can be used at MOBIL® gasoline stations to purchase gasoline and other goods. When the SPEEDPASS® is waved pass a transponder in the gasoline pump, the transponder recognizes the particular SPEEDPASS® and charges the subsequent purchase amount to a particular account specified by the user.

In an alternate embodiment, the transponder 1418 is embodied as a credit card or debit card reader. As is known, such cards are provided with a magnetic strip into which account information is encoded and by which payment can be accomplished. For purposes of this disclosure a debit card and other such cards with magnetic strips or memory devices into which information is encoded are considered to be a "credit card" in that all such devices identify at least an account from which funds can be transferred to pay for a content file transmission.

As shown in FIG. 1, the transponder 1418 is coupled to the processor 1412, which is in turn coupled to a data network interface device 1411, such as a cable modem or other device. In FIG. 1, the network interface device is shown as being part of the point of sale controller 1410. Data exchanges that effectuate payment for file transfers can occur via an Internet 20 data transfer or via a direct data link 22 to a payment service center 24. As set forth above, content file transfers are paid for. Payment is effectuated by a data exchange between the payment verification service center (e.g., VISA, MASTERCARD, AMERICAN EXPRESS, et al.) and the point of sale terminal 14. Whether the transponder is a card reader or an RFID transponder, they both detect a content purchaser-identification device (e.g., a credit card, debit card, RFID) such that a content file transfer can be paid for.

FIG. 2 shows an alternate embodiment of a system 10 for distributing content files wirelessly. The system shown in FIG. 2 differs from the system shown in FIG. 1 by the logical and physical location of the content storage device 1406. In FIG. 2, the content file storage device 1406 is coupled or linked to the point of sale terminal 14 (and hence the transmitter 1402 within the point of sale terminal 14) via the Internet 20.

Centrally locating the content file storage device 1406 and linking it to the Internet 20 makes it possible to provide wireless content file distribution services to virtually any point of sale device that is capable of wireless file transfers and that has Internet access. In the embodiment shown in FIG. 2, the centrally located content file storage device 1406 is Internet 20 accessible, thereby eliminating the need for a special network over which content files can be transferred and making the content files available virtually anywhere Internet access is available.

In the embodiment of FIG. 2, the processor 1412 within the terminal 14 also handles the processing overhead required to access the Internet, such as providing the display of a web browser on the user interface terminal 1408 and/or otherwise, such that files available on the storage device 1406, can be listed and from which they can be selected for purchase and transmission.

Figure 3:
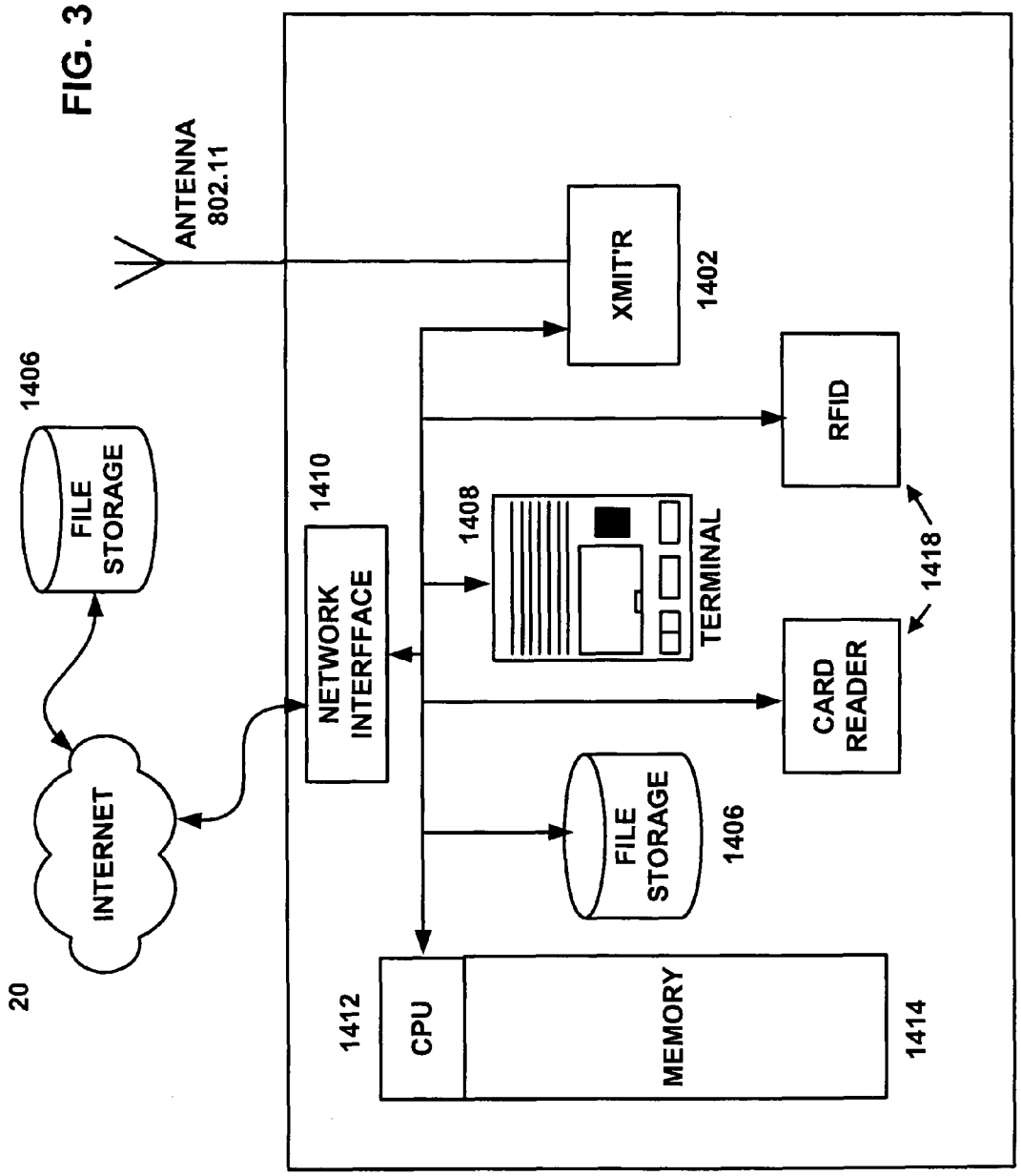
FIG. 3 illustrates extra detail of the functional relationships between the various components of the point of sale terminal device.

FIG. 3 shows an example of how the processor 1412 can be coupled to the several peripheral devices in the point of sale terminal 14 shown in FIG. 1 and FIG. 2. First, program instructions for the processor 1412 are stored in a memory device 1414, such as the devices mentioned above. Information about content files that are available can be read by the processor 1412 from the content file storage device 1406 whether the content file storage device 1406 is coupled to the processor's address/data/control bus or coupled to the processor 1412 via an Internet 20 link.

Once the available content files are determined, the processor 1412 sends such data to the user interface terminal 1408 on which the available files are displayed under the control of the processor 1412 so that the files can be selected from the terminal 1408 by a user.

Content file selections that are made by a user at the user interface terminal 1408 are "read" by the processor 1412, causing the processor 1412 to retrieve at least part of the selected file from the content storage device 1406. The processor thereafter "feeds" all or part of a selected file to a transmitter 1402 for broadcast and hopefully reception by a compatible wireless playback device (not shown) having the MAC address to which the file is addressed.

In at least some alternate embodiments, it might be desirable to encrypt or encode content files prior to their transmission. Encryption, encoding or "watermarking" of a content file if desired, can be performed by the processor 1412 under the direction and control of software instructions stored in the memory 1414, prior to the file's transmission. In alternate embodiment, encoded and/or encrypted files can be stored as such on the file storage device 1406.

Figure 4:
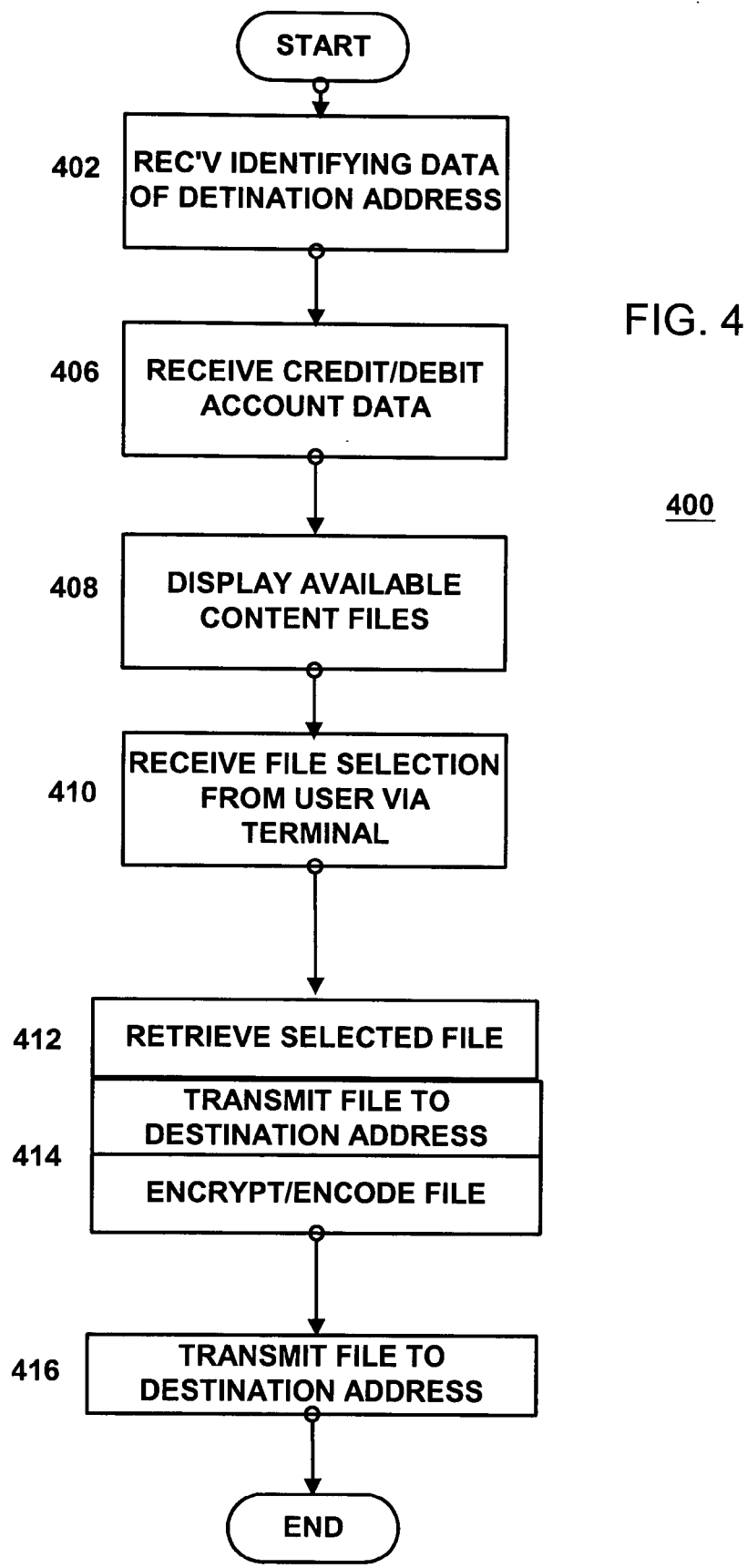
FIG. 4 shows steps of a method for wireless distribution of content from a point of sale terminal device.

FIG. 4 depicts steps of a method of wirelessly distributing content information.

At the outset, in step 402, information is received at a point of sale terminal that can include a MAC address to which a file, if purchased, should be addressed for transmission. In step 402, the MAC address can be acquired by the user's entry at the user interface terminal 1408, by reading it from an RFID or even via information encoded onto a credit card.

In step 406, prospective purchaser-identifying account information is also obtained. Like step 402, information acquired in step 406 can be acquired from the terminal 1408, an RFID or credit card.

Whether the MAC address is obtained first or account information is obtained first is a design choice and the two orders in which these two different pieces of information are equivalent. For purposes of claim construction, acquiring a MAC address before or after an account is obtained are equivalent In step 408, the processor displays available content file information on the user interface terminal. In step 410, the processor retrieves a user's selection of a content file is retrieved from the user interface terminal. Upon the selection of a content file, in step 412 the file, such an MP3 file, an MPEG file or a data file, is retrieved by the processor from the content file storage device, wherever it's located. As set forth above, in step 414 a content file can be optionally encoded for a particular playback device or a particular type of playback device. A file can also be encrypted so as to prevent their piracy. Finally, in step 416, the content file is transmitted under the control of the processor 1412 to a particular MAC address, whether it is encoded or encrypted.

Figure 5:
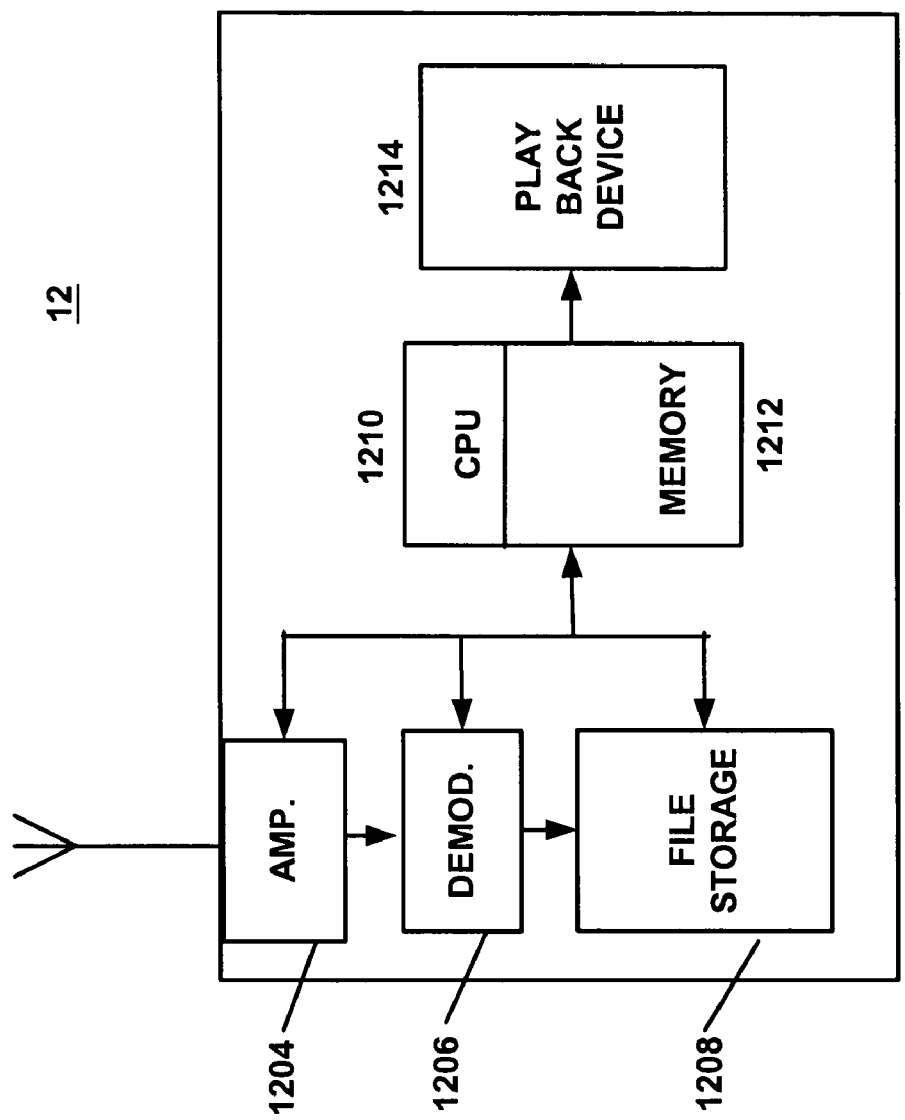
FIG. 5 depicts an exemplary embodiment of a wireless playback device.

Finally, FIG. 5 shows an exemplary embodiment of a wireless playback device 12.

An antenna 1202 picks up radio frequency signals and conducts them to an amplifier 1204. The output of the amplifier 1204 is coupled into an FM demodulator 1206. The output of the demodulator 1206 is data, which when routed to an appropriate digital to analog converter or other display device, renders human-perceptible content such as music, video or a text message.

The various structures of the wireless playback device 12 are coupled to and under the control of at least one processor 1210, which is coupled to a memory device 1212 wherein instructions for the processor 1210 are stored and accessible to it. By appropriate program control, radio frequency signals that are picked up at the antenna are amplified, demodulated and decoded by the processor to determine whether the signals carried by radio contain data having the MAC address of the playback device 12. If they do, the data is stored in the file store memory 1208 for subsequent playback through an appropriate playback device (speaker, LCD screen, etc.) 1214.

The point of sale terminal 14 and the wireless playback device 12 comprises two of a plurality of components by which content files can be distributed into playback devices wirelessly. The structures, devices and steps described herein are just exemplary. There may be many variations to these without departing from the spirit of the invention. For instance, the steps may be performed in a differing order, or steps may be added, deleted, or modified.

Wireless data transfer of music, news and/or video from point of sales terminals, (like the point of sale terminals currently in use at gasoline stations through out the United States and elsewhere) can provide increased content sales for content providers and can provide an additional revenue source to merchants who can also sell goods and services using point of sale terminals. The ability to perform wireless file transfers at point of sale terminals can also increase the enjoyment that consumers now experience through devices like the iPOD® by doing away with the need to physically connect a playback device to a computer.

By providing a point of sale terminal with the ability to transfer data files wirelessly, such as by way of the I.E.E.E. 802.11 standard and others like it, a point of sale terminal can function as a point of sale terminal for goods and services but it can also become a point of sale terminal for music, video, news and other forms of data that might be of value or interest to a customer of a gas station while he or she is waiting to fuel his or her vehicle.

Although exemplary implementations of the invention have been depicted and described in detail herein, it will be apparent to those skilled in the relevant art that various modifications, additions, substitutions, and the like can be made without departing from the spirit of the invention and these are therefore considered to be within the scope of the invention as defined in the following claims.

We claim:

1. A point of sale terminal device comprising:
   a transmitter, said transmitter configured for transmitting signals according to a predetermined wireless data transfer protocol, that is data that represents information content;
   a content file storage device operably coupled to the transmitter, said content file storage device storing at least a part of one file that represent at least one of: audio information and video information;
   a user-interface terminal on which information can be displayed to a user, and through which a user can select a file for transmission from the transmitter;
   a separate point of sale controller that functions to effectuate a sale of at least one of goods, services and commodities from ancillary sales devices so that sales of content are handled by a separate controller and its own associated program instructions;
   a processor, operably coupled to the transmitter, the user-interface terminal, and the content file storage device, the processor controlling content file sales, and
   one or more computer-readable non-transitory media, operably coupled to the processor, said one or more computer-readable non-transitory media storing program instructions, which when executed by the processor cause the processor to:
   acquire information from the terminal that identifies a first content file to transmit from the transmitter;
   acquire a content file from the content file storage device;
   transfer the first content file from the content storage device to the transmitter;
   effectuate the transmission of the first content file from the transmitter to a receiver device according to a first wireless data transfer protocol; and
   wherein information received at the point of sale terminal device includes a MAC address to which a file is addressed for transmission, and wherein the MAC address is acquirable by an entry at the user interface terminal; and
   wherein the content file storage device has a list of content files available, of which at least one is selectable for transmission from the transmitter to the user-interface terminal, and wherein in addition to displaying content files that are available, information displayed in the user-interface terminal includes information pertinent to a user's purchase of goods, services or commodities from an ancillary sale device;
   wherein the content file storage device is centrally located and linked to the Internet, and wherein the centrally located content file storage device effects wireless content file distribution services to virtually any point of sale device that is capable of wireless file transfers and that has Internet access; and
   wherein the processor for controlling content file sales is a first processor, wherein the point of sale controller is a second processor to control an ancillary sales device, and wherein the first processor is separate from the second processor.

2. The point of sale terminal device of claim 1, further comprising:
a point of sale terminal transponder, operably coupled to said processor, said point of sale terminal transponder configured for detecting a content purchaser-identification device and acquiring information from the purchaser-identification device that identifies an account from which payment for a content file sale can be obtained.

3. The point of sale terminal device of claim 2 wherein the point of sale terminal transponder is a credit card reader.

4. The point of sale terminal device of claim 1, further comprising:
a point of sale terminal transponder, operably coupled to said processor, said point of sale terminal transponder configured for detecting a content purchaser-identification device and acquiring information from the purchaser-identification device, a media access control address of a device, to which a file from the content file storage device is to be transmitted by the transmitter.

5. The point of sale terminal device of claim 2 wherein the point of sale terminal transponder is a radio frequency identifier module (RFID).

6. The point of sale terminal device of claim 1 wherein said content file storage device is a storage device that stores data files representing music.

7. The point of sale terminal device of claim 1 wherein said content file storage device is a storage device that stores MP3 data files.

8. The point of sale terminal device of claim 1, wherein said transmitter is a transmitter that transmits data in substantial compliance with I.E.E.E. standard 802.

9. The point of sale terminal device of claim 1 wherein the content file storage device is comprised of at least one file storage device that is operably coupled to the transmitter via the Internet.

10. The point of sale terminal device of claim 1, further comprised of an ancillary sales device, operably coupled to the processor, said ancillary sales device being a gasoline pump.

11. A point of sale terminal device comprising:
a transmitter, said transmitter configured for transmit signals according to a predetermined wireless data transfer protocol, that is data that represents information content;
a data network interface, operably coupling the point of sale terminal device to a data network through which content files can be transferred;
a user identification device;
a user-interface terminal on which information can be displayed to a user, and through which a user can select a file for transmission from the transmitter;
a separate point of sale controller that functions to effectuate a sale of at least one of goods, services and commodities from ancillary sales devices so that sales of content are handled by a separate controller and its own associated program instructions;
a processor, operably coupled to the transmitter, the user identification device, the data network interface, the user interface terminal, the processor controlling both content file sales and ancillary sales, and
one or more computer-readable non-transitory media, operably coupled to the processor, said one or more computer-readable non-transitory media storing program instructions, which when executed by the processor cause the processor to:
acquire information from the purchaser-identification device that identifies at least one of: an account by which a music file purchase can be paid for; and a first address of a receiver device to which a music file will be transmitted by the transmitter;
transfer at least part of a first music file from a music file storage device to the transmitter via the data network interface;
effectuate the transmission of the first music file from the transmitter to a receiver device that is identified by the first address; and
wherein information received at the point of sale terminal device includes a MAC address to which a file is addressed for transmission, and wherein the MAC address is acquirable by an entry at the user interface terminal; and
wherein the content file storage device has a list of content files available, of which at least one is selectable for transmission from the transmitter to the user-interface terminal, and wherein in addition to displaying content files that are available, information displayed in the user-interface terminal includes information pertinent to a user's purchase of goods, services or commodities from an ancillary sale device;
wherein the content file storage device is centrally located and linked to the Internet, and wherein the centrally located content file storage device effects wireless content file distribution services to virtually any point of sale device that is capable of wireless file transfers and that has Internet access; and
wherein the processor for controlling content file sales is a first processor, wherein the point of sale controller is a second processor to control an ancillary sales device, and wherein the first processor is separate from the second processor.

12. The point of sale terminal device of claim 11, wherein the user-identification device is a credit card reader.

13. The point of sale terminal device of claim 11 wherein the user-identification device is a radio frequency identifier module (RFID).

14. The point of sale terminal device of claim 11, wherein the data network interface is an interface that couples the point of sale terminal device to the Internet.

15. The point of sale terminal device of claim 11, wherein said transmitter is a transmitter that transmits data in substantial compliance with I.E.E.E. standard 802.

16. The point of sale terminal device of claim 11, further comprised of an ancillary sales device, operably coupled to the processor, said ancillary sales device being a gasoline pump.

17. The point of sale terminal of claim 11 wherein the first address is comprised of a MAC address.

18. A method of wirelessly distributing content information at a point of sale terminal comprising the steps of:
receiving at a point of sale terminal, information identifying a first address that is the address of a device to which data can be wirelessly transferred;
receiving at the point of sale terminal, information that identifies a first data file to transmit to the first address;
transmitting from the point of sale terminal, a wireless signal that carries at least part of the first data file; and
wherein information received at the point of sale terminal includes a MAC address to which a file is addressed for transmission, and wherein the MAC address is acquirable by an entry at the user interface terminal; and wherein controlling content file sales and ancillary sales is effected by a single processor at the point of sale terminal;

wherein two separate controllers provide respective programming required to provide two different functionalities, wireless content file distribution and commodity sales; and wherein the content file storage device has a list of content files available, of which at least one is selectable for transmission from the transmitter to the user-interface terminal, and wherein in addition to displaying content files that are available, information displayed in the user-interface terminal includes information pertinent to a user's purchase of goods, services or commodities from an ancillary sale device;

wherein the content file storage device is centrally located and linked to the Internet, and wherein the centrally located content file storage device effects wireless content file distribution services to virtually any point of sale device that is capable of wireless file transfers and that has Internet access; and wherein the processor for controlling content file sales is a first processor, wherein the point of sale controller is a second processor to control an ancillary sales device, and wherein the first processor is separate from the second processor.

19. The method of claim 18, further comprising the step of: retrieving the first data file from a data file storage device that stores a plurality of data files.

20. The method of claim 18, wherein the step of transmitting a wireless signal includes the step of transmitting an MP3 file.

21. The method of claim 18, further comprising the step of receiving at the point of sale terminal, information that identifies an account by which the transmission of the first data file to the first address can be paid for.

22. The method of claim 18, further comprising the step of: encrypting the first data file prior to its transmission.

23. The method of claim 18, further comprising the step of encoding the first data file into a format that is compatible with only the device having the first address.

* * * * *